Oct. 12, 1948.　　　　　K. P. GROAT　　　　　2,451,385
CONTROL OF CONVERTIBLE EVAPORATOR-CONDENSERS
FOR USE IN REFRIGERATIVE CIRCUITS
Filed July 22, 1946
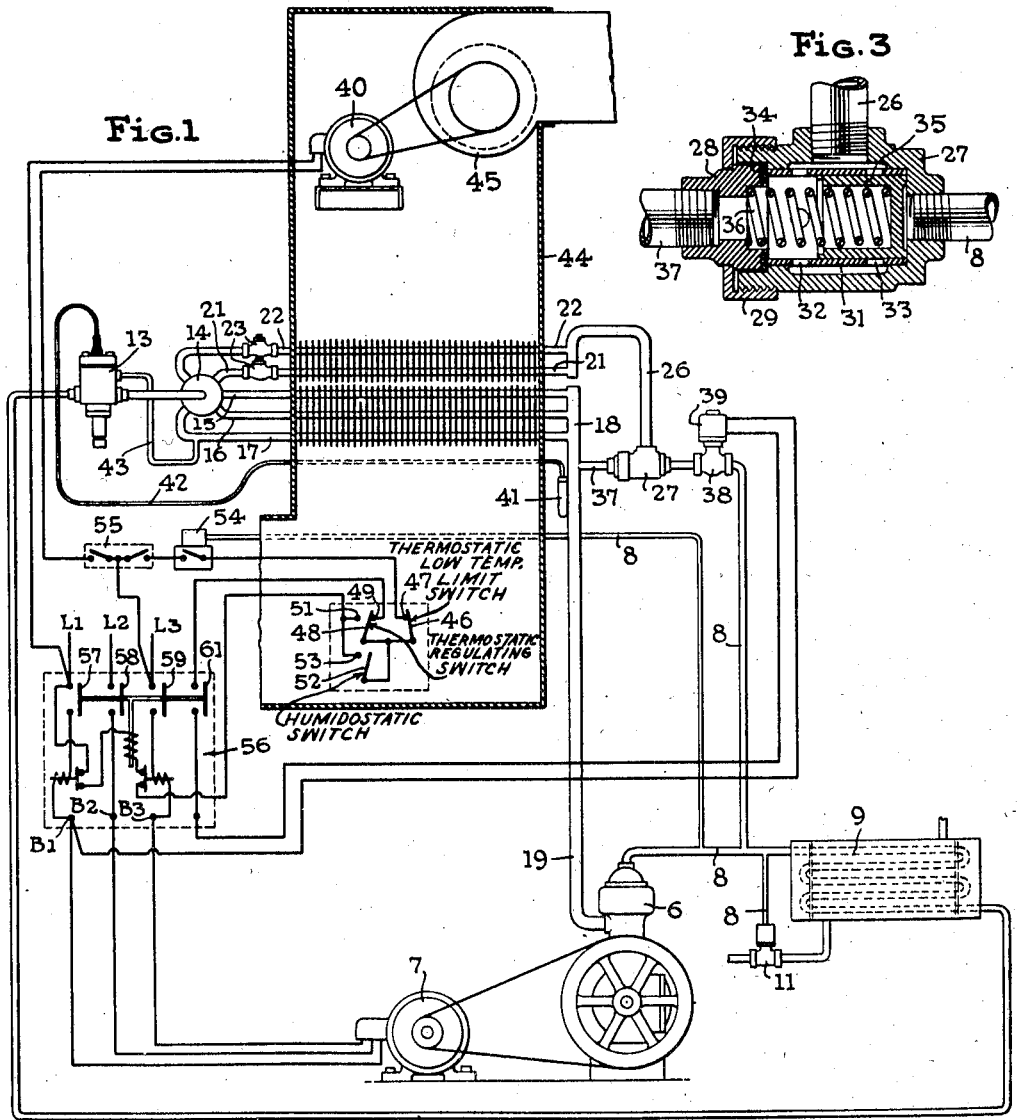
Inventor
Keith P. Groat Patented Oct. 12, 1948

2,451,385

UNITED STATES PATENT OFFICE 2,451,385

CONTROL OF CONVERTIBLE EVAPORATOR-CONDENSERS FOR USE IN REFRIGERATIVE CIRCUITS

Keith P. Groat, York, Pa., assignor to York Corporation, York, Pa., a corporation of Delaware Application July 22, 1946, Serial No. 685,436

4 Claims. (Cl. 62—115)

This invention relates to refrigeration and particularly to means for operating an evaporating coil temporarily as a condenser. This might be required for various special purposes such as defrosting, but the invention was developed in connection with an air conditioner operating according to the principle disclosed in the patent to Newton 2,195,781, issued April 2, 1940, and will be here described as so embodied.

According to this embodiment of the invention, the evaporator of a refrigerative conditioner is divided into two sections arranged serially in the path of the air being conditioned. The first section always acts as a refrigerative evaporator to abstract heat from the air and thus cool and dehumidify it. The second section normally acts as a refrigerative evaporator but at times is converted into a condenser so as to serve as a reheater for the air cooled and dehumidified by the first section.

When temperature or humidity is, or both are, above chosen values the system operates. If temperature is above the chosen value both sections operate as evaporators, regardless of the degree of humidity. If temperature is below and humidity is above the chosen value the system operates with the second section functioning as a condenser. Under such conditions the temperature of the first section is somewhat reduced, since the compressor operates at constant speed. If both temperature and humidity fall below the chosen values the system is shut down. A thermostatic limit switch is added to shut the system down if temperature falls below a set limit.

The conditioner about to be described operates on the same basic principle as does the Newton device but makes use of a greatly simplified valve mechanism for converting the second evaporator section to a condenser. This change avoids maintenance difficulties encountered heretofore, reduces the cost of manufacture, simplifies the control, and improves the operating characteristics of the plant, making it commercially practicable for small units which receive little or no maintenance attention.

An illustrative embodiment of the invention will now be described by reference to the accompanying drawings, in which—

Fig. 1 is a diagram part in section but chiefly in elevation, illustrating the complete system.

Fig. 2 is an axial sectional view of the differential flow valve, drawn on a larger scale.

Fig. 3 is an axial sectional view of the three-way pressure operated valve or "switch valve" which determines the function of the second section of the evaporator.

Referring to Fig. 1 a compressor 6 is driven by motor 7 and delivers compressed refrigerant through line 8 to a water-cooled condenser 9. In Fig. 1 line 8 which is commonly called the "hot gas line" has several branches each of which is in free communication with the main line. For this reason the numeral 8 is used collectively for the line and branches. A pressure regulated valve 11 responsive to pressure in line 8 controls the flow of cooling water to condenser 9, increasing the flow of water as head pressure rises and decreasing it as head pressure falls.

Refrigerant liquified in condenser 9 flows by liquid line 12 to the thermostatic expansion valve 13 which discharges through distributor 14 into both sections of the evaporator. The coils 15, 16, 17 typify the first section of the evaporator and these are connected by manifold 18 and suction line 19 with the compressor intake. The coils 21 and 22 typify the second section of the evaporator, and each is fed through a corresponding differential flow valve 23, whose construction is shown in Fig. 2.

As indicated in Fig. 2 the valves 23 may comprise ordinary flap check valves 24 each with a bleed port 25. Any scheme that would permit free flow toward the coils and restrict back flow can be substituted.

The coils 21, 22 discharge into a manifold connection 26 which leads to the side connection of the switch valve indicated in Fig. 1 by the numeral 27 applied to its body. The construction of the switch valve is shown in Fig. 3.

The body 27 and head 28 are connected by sleeve nut 29 and form the valve housing. In the body is a seat bushing 31 with ports 32 and 33 to which the manifold connection 26 leads. The bushing 31 seals on a gasket 34 which projects inward far enough to offer a seat for the rim of the cup-shaped valve 35 when that is forced to the left against the urge of a coil compression spring 36. This spring urges the valve to the right. A port through head 28 is connected by branch 37 with suction line 19. A port in the righthand end of body 27 is connected to the high pressure gas line 8 through a normally closed valve 38. This valve may be opened by energizing solenoid 39. Expansion valve 13 has the sual thermostatic bulb 41 on suction line 19 with connecting capillary tube 42. The usual pressure connection appears at 43 and is shown connected to coil 17.

With the compressor running and valve 38 closed valve 35 will move to the right exposing ports 32. It need not seal tight, since valve 38 prevents flow through the right end port. Thus 26 is connected to the suction line and coils 21, 22 operate as evaporators. If valve 38 be opened the hot gas will force valve 35 to the left until it seals on gasket 34. This disconnects manifold 26 from suction line 19 and admits hot gas from line 8 through ports 33 and manifold 26 to coils 21, 22. Ports 25 develop the necessary back pressure to cause coils 21, 22 to operate as condensers. Refrigerant condensed therein flows through ports 25 to the first evaporator section coils 15, 16, 17.

Observe that parts so far described could be present in any compressor-condenser-evaporator circuit having a divided evaporator so that the conversion scheme is obviously generally available for any use—for example, if coils 21 and 22 were operated at sub-freezing temperature they could be defrosted by opening valve 38. Similarly, by mere duplication, each section of the evaporator could be provided with defrosting means.

The finned heat transfer portions of the coils 15, 16, 17, 21 and 22 extend across a duct 44. A fan 45 driven by motor 40 draws air upward through the duct 44 from the conditioned space, causes it to flow over the coils, and discharges it back into the conditioned space. Atmospheric conditions could be sensed in the room but I prefer to locate the controls in the air stream flowing toward the coils because this gives a good average indication of room conditions.

Switch 46 is an ordinary thermostatic switch which is normally closed against its contact 47 and opens to stop the unit if temperature falls abnormally low. It is thus merely a low limit switch normally performing no regulatory function. Switch 48 is the regulatory thermostatic switch and is a snap acting two contact switch. If temperature is below its control point it closes against contact 49. If temperature is above its control point it closes against contact 51. Switch 52 is a humidostatic switch which closes against contact 53 when humidity is high. The device 54 is a safety pressure switch which opens in response to excess pressure in line 8. Switch 55 is a dual manual switch used to shut down or run fan 45 and to shut down or condition for operation the main compressor motor.

The electric leads are indicated at L1, L2 and L3 and the lines to motor 7 at B1, B2 and B3. The starter switch shown in diagram at 56 has four contactors 57, 58, 59 and 61. The first three of these control the motor 7 while 61 controls the solenoid 39 by controlling a circuit from B1 through solenoid 39 through contactor 61 to 49.

The control circuit for the starter is from L3 through switch 55, pressure switch 54, limit switch 46 to switches 48 and 52 and thence via contact 51 or 53 and the control circuit of the starter 56 to L1. If switch 48 closes against contact 51 motor 7 will run regardless of the position of switch 52 but the circuit through solenoid 39 is open at 49 so valve 38 is closed and all coils operate as evaporators. If switch 48 closes against contact 49, humidostat switch 52 is in control. If it closes motor 7 runs and solenoid 39 is energized so that valve 38 opens and coils 21, 22 operate as refrigerant condensers.

The details of the starter switch 56 are conventional. The limit switch 46 is provided to shut down the system if the temperature goes abnormally low while the machine operates under the control of humidity switch 52.

The embodiment illustrated is exemplary only for, as stated, the principles of the invention can be variously applied and can be used for various purposes.

What is claimed is:

1. The combination of a refrigerative circuit including an evaporator having an inlet for volatile refrigerant and a suction connection; flow controlling means at said inlet adapted to permit free flow into the evaporator and restricted flow in the reverse direction; valve means controlling said suction connection; yielding means normally maintaining said valve means open; a combined expansible chamber motor and flow controller adapted to close said valve means when said motor is subjected to pressure, and so arranged that as the motor moves in valve closing direction it first throttles flow through said valve means and then opens a passage from the expansible chamber motor to the evaporator; a source of warm refrigerant gas under pressure; and a valve controlling flow therefrom to said motor.

2. In a refrigerative circuit, the combination of a compressor; a condenser to which the compressor delivers compressed refrigerant; expansion valve means fed by the condenser; an evaporator comprising at least two sections fed in parallel by the expansion valve means, and each having a connection to the compressor intake; differential flow means between the expansion valve means and at least one section of the evaporator, arranged to permit free flow toward said evaporator section and to restrict flow in the reverse direction; a hot gas line leading from the compressor discharge; a three way valve interposed in the connection between said evaporator section and the compressor intake and connected with said hot gas line, said valve having a normal position in which it places the evaporator section in communication with the compressor intake and an abnormal position in which it interrupts said communication and connects the hot gas line with the evaporator section; means biasing said valve to said normal position; a pressure motor for opening said valve despite said bias, said motor being subject to pressure in the hot gas line; and a valve controlling said hot gas line.

3. The combination defined in claim 2 in which the differential flow means comprise a freely opening one way flow valve, and a constantly open restricted flow passage in parallel flow relation therewith.

4. The combination defined in claim 2 in which the three way valve comprises a body having two spaced sets of side ports connected with said evaporator section, and ports in its opposite ends connected respectively with the compressor intake and with the hot gas connection; a piston valve shiftable in said housing to expose said sets of side ports selectively at opposite ends of the valve and serving at one limit of motion to seal the end port which leads to the compressor intake; and a spring urging said valve away from the position just named but with insufficient force to resist hot gas pressure reacting on said valve.

KEITH P. GROAT.

REFERENCES CITED

The following references are of record in the file of this patent:

UNITED STATES PATENTS

| Number | Name | Date |
|---|---|---|
| 2,141,715 | Hilger | Dec. 27, 1938 |
| 2,195,781 | Newton | Apr. 2, 1940 |